(12) United States Patent
Hou et al.

(10) Patent No.: US 8,845,021 B2
(45) Date of Patent: Sep. 30, 2014

(54) ADJUSTMENT MECHANISM FOR POSITIONING A HEADREST IN AN INFANT CAR SEAT

(75) Inventors: Hung-Chung Hou, Taibao (TW); Chin-Hui Wang, Chiayi (TW); Shau-An Hsu, Dounan Township, Yunlin County (TW)

(73) Assignee: Lerado (Zhong Shan) Industrial Co., Ltd, Zhong Shan, Guang Dong Province (CN)

( * ) Notice: Subject to any disclaimer, the term of this patent is extended or adjusted under 35 U.S.C. 154(b) by 227 days.

(21) Appl. No.: 13/412,360

(22) Filed: Mar. 5, 2012

(65) Prior Publication Data

US 2012/0223559 A1 Sep. 6, 2012

(30) Foreign Application Priority Data

Mar. 3, 2011 (CN) ...................... 2011 2 0054167 U

(51) Int. Cl.
*B60N 2/28* (2006.01)
(52) U.S. Cl.
CPC ............ *B60N 2/2851* (2013.01); *B60N 2/2872* (2013.01); *B60N 2/2812* (2013.01)
USPC ........................................ 297/250.1; 297/410
(58) Field of Classification Search
USPC ............... 297/250.1, 256.1, 353, 410, 411.36
See application file for complete search history.

(56) References Cited

U.S. PATENT DOCUMENTS

| | | | | | |
|---|---|---|---|---|---|
| 1,111,685 | A | * | 9/1914 | Allison | 297/353 |
| 2,239,732 | A | * | 4/1941 | Newhardt | 297/353 |
| 2,509,102 | A | * | 5/1950 | Kuebler | 297/353 |
| 4,632,458 | A | * | 12/1986 | Brown et al. | 297/353 |
| 5,695,251 | A | * | 12/1997 | Scolari | 297/410 |
| 5,795,026 | A | * | 8/1998 | Dral et al. | 297/411.36 |
| 6,491,348 | B1 | | 12/2002 | Kain | |
| 6,527,339 | B2 | | 3/2003 | Voris | |
| 6,688,658 | B2 | | 2/2004 | Mori et al. | |
| 6,761,410 | B2 | * | 7/2004 | Lee | 297/411.36 |
| 7,055,903 | B2 | | 6/2006 | Balensiefer et al. | |
| 7,434,887 | B1 | * | 10/2008 | Hsien | 297/411.36 |
| 7,857,385 | B2 | * | 12/2010 | Zink et al. | 297/256 |
| 2012/0153690 | A1 | * | 6/2012 | Gaudreau, Jr. | 297/250.1 |

* cited by examiner

*Primary Examiner* — Peter Brown
(74) *Attorney, Agent, or Firm* — Muncy, Geissler, Olds & Lowe, P.C.

(57) ABSTRACT

An adjustment mechanism for positioning a headrest in an infant car seat includes a connector, a pair of gear wheels, a ratchet wheel and a brake release handle. The adjustment mechanism is installed on the back support portion of the infant car seat which formed with a longitudinal slot and a pair of toothed guiding rails mounted in parallel on either side of the longitudinal slot. The headrest is movably connected to the back support portion by the connector to move along the longitudinal slot. The pair of gear wheels and a ratchet wheel are pivoted on the connector, the pair of gear wheels being engaged with the pair of toothed guiding rails and kept synchronized rotation with the ratchet wheel. The brake release handle is biased to releasably lock the ratchet wheel and used to unlock the ratchet wheel so as to reposition the headrest.

11 Claims, 9 Drawing Sheets

ADJUSTMENT MECHANISM FOR POSITIONING A HEADREST IN AN INFANT CAR SEAT

BACKGROUND OF THE INVENTION

1. Field of the Invention

The present invention relates generally to an adjustment mechanism, especially to an adjustment mechanism used to adjust a headrest in an infant car seat by simply push or pull a handle accessible near the headrest.

2. Description of the Related Art

The use of child car seats to safely secure infants and small children in a moving vehicle is well known in the prior art. In fact, most states mandate that children under a certain weight and/or height must be secured in a specially configured car seat.

Approved car seats are designed to restrain the child in the event the vehicle in which he or she is riding rapidly decelerates, suddenly stops or is involved in an accident or other impact event that would otherwise cause an unsecured child to impact the inside of the vehicle and be injured or killed. The typical car seat includes a body portion that is secured to a seat in the vehicle and a harness system that secures the child to the car seat.

For protection to the head and neck for an infant, normally a headrest is provided in the infant car seat to be manually adjusted to accommodate infants for different heights. However, the adjustment of headrest to present commercial available infant car seat as well as the variety of designs disclosed in U.S. Pat. Nos. 6,688,658, 6,527,339, 6,491,348 and 7,055,903, all are too complex, inconvenient and not easy to manipulate the adjustment.

SUMMARY OF THE INVENTION

To solve the mentioned problems, the present invention provides an adjustment mechanism for positioning the headrest in an infant car seat, which includes a connector, a pair of gear wheels, a ratchet wheel and a brake release handle.

The adjustment mechanism is installed on the back support portion of the infant car seat which formed with a longitudinal slot and a pair of toothed guiding rails in parallel on either side of the longitudinal slot. The headrest is movably connected to the back support portion by the connector to move along the longitudinal slot.

The pair of gear wheels and a ratchet wheel all are pivoted on the connector by same one synchro shaft, the pair of gear wheels being engaged with the pair of toothed guiding rails and kept synchronized rotation with the ratchet wheel. As the brake release handle is biased to releasably lock the ratchet wheel, when the brake release handle is pushed or pulled, the ratchet wheel is to be unlocked for permitting a user to move the headrest along the longitudinal slot to a selected position.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
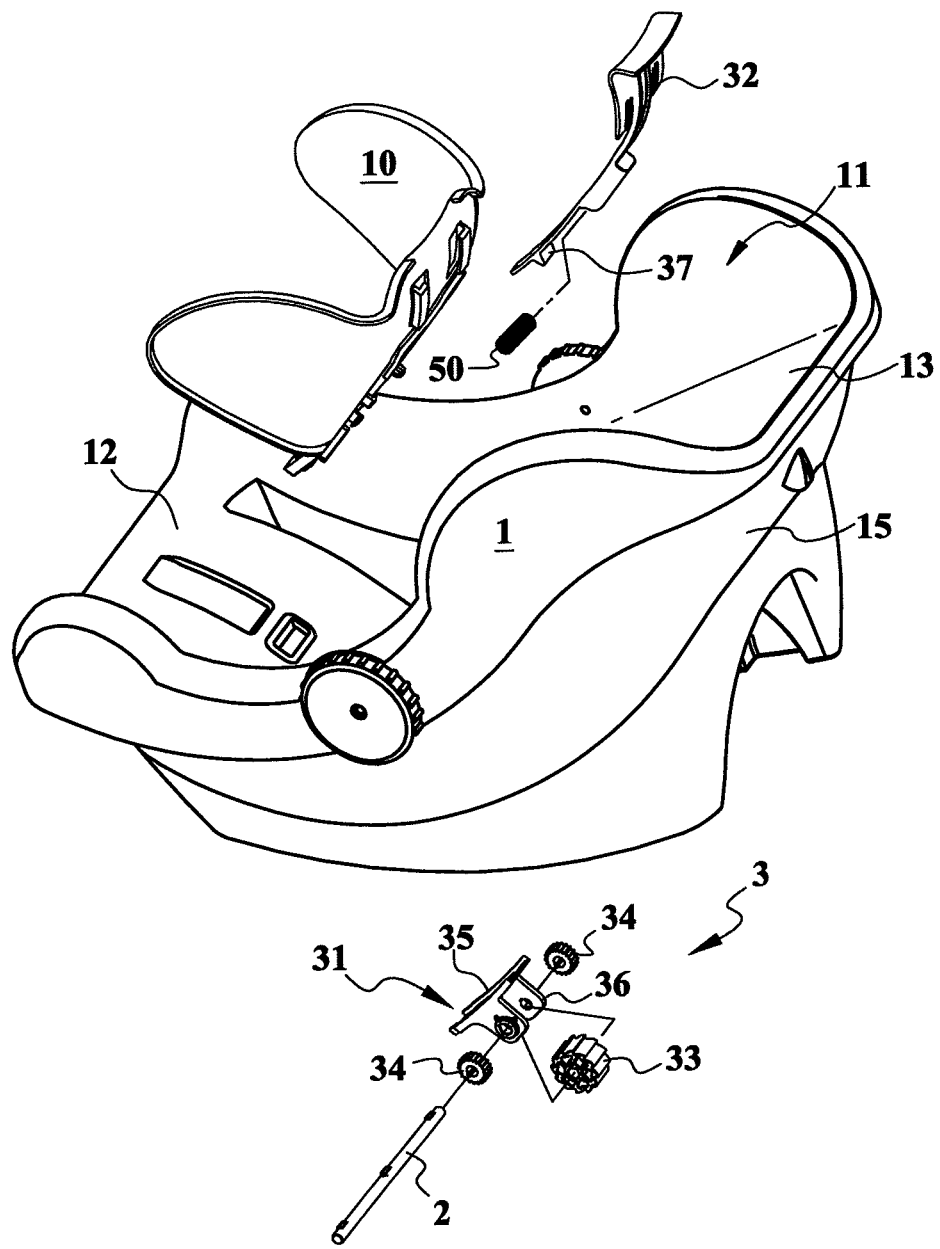
FIG. 1 is a partially exploded perspective view showing an embodiment of the adjustment mechanism for positioning a headrest in an infant car seat according to the present invention.
Figure 2:
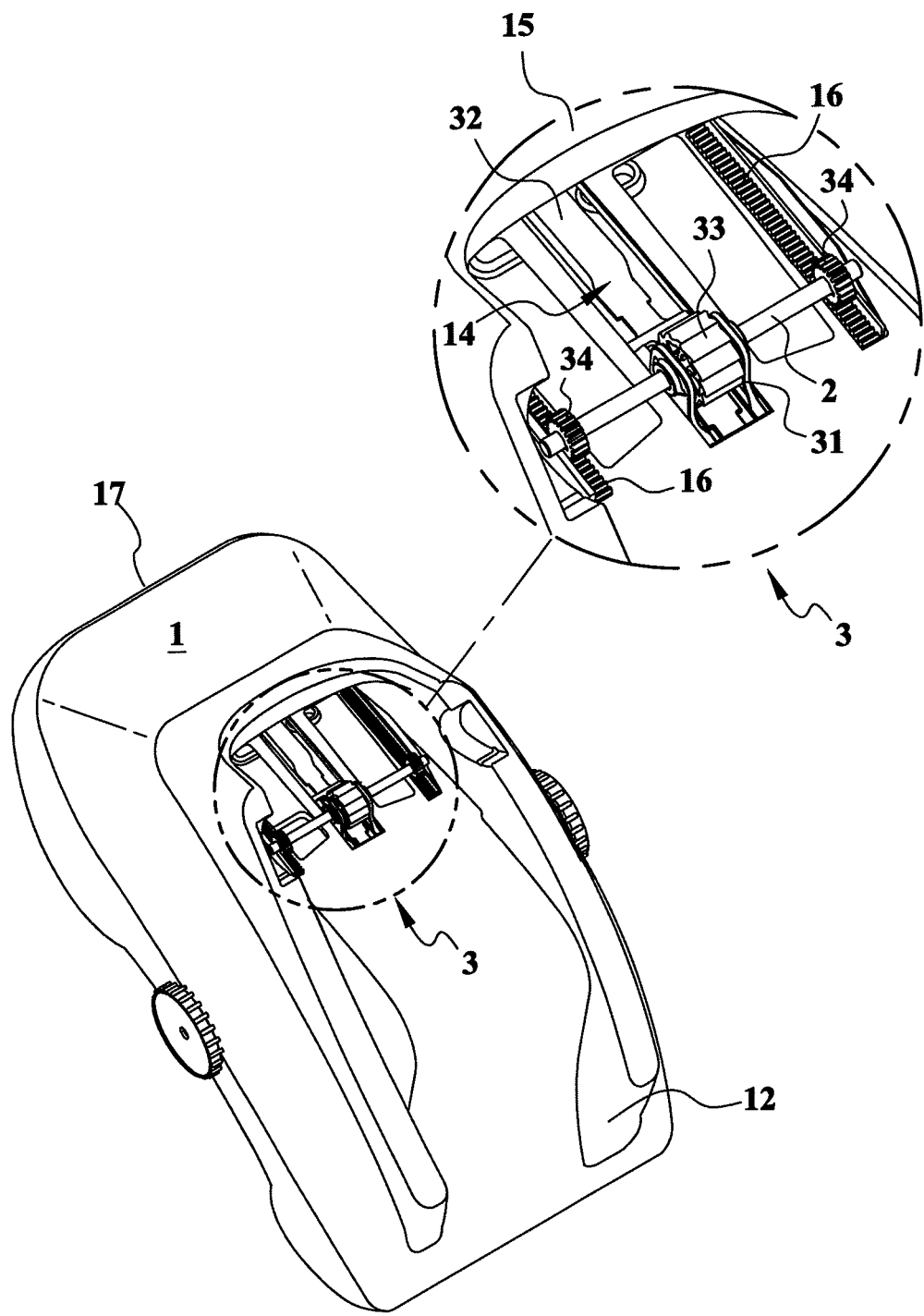
FIG. 2 is a schematic perspective view showing the adjustment mechanism on the underside of the infant car seat.
Figure 3:
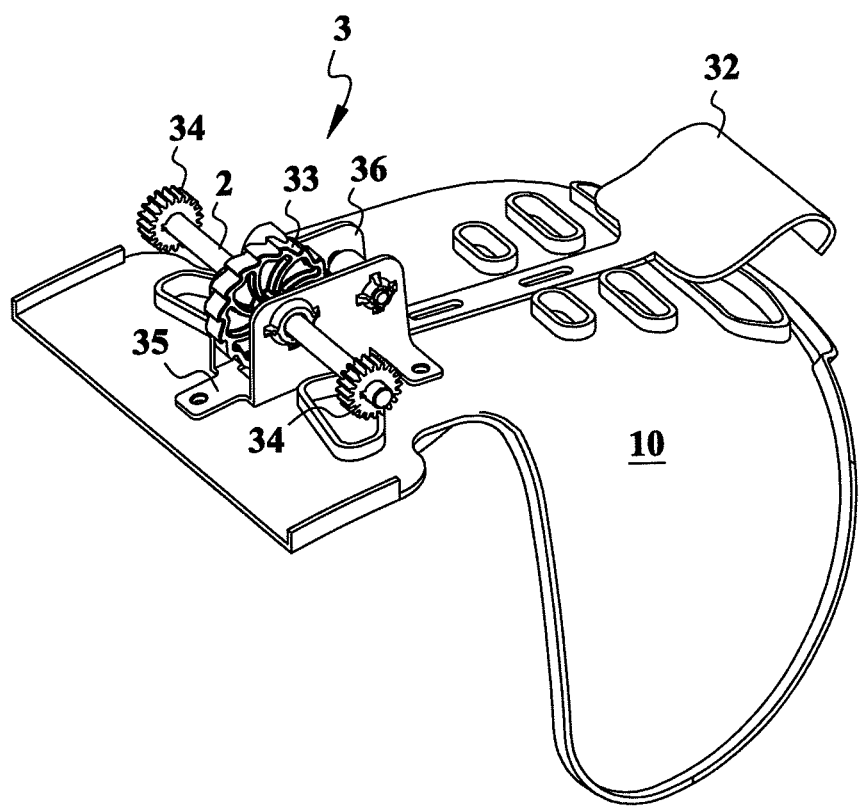
FIG. 3 is a perspective view showing an adjustment mechanism connected with the headrest of the embodiment.
Figure 4:
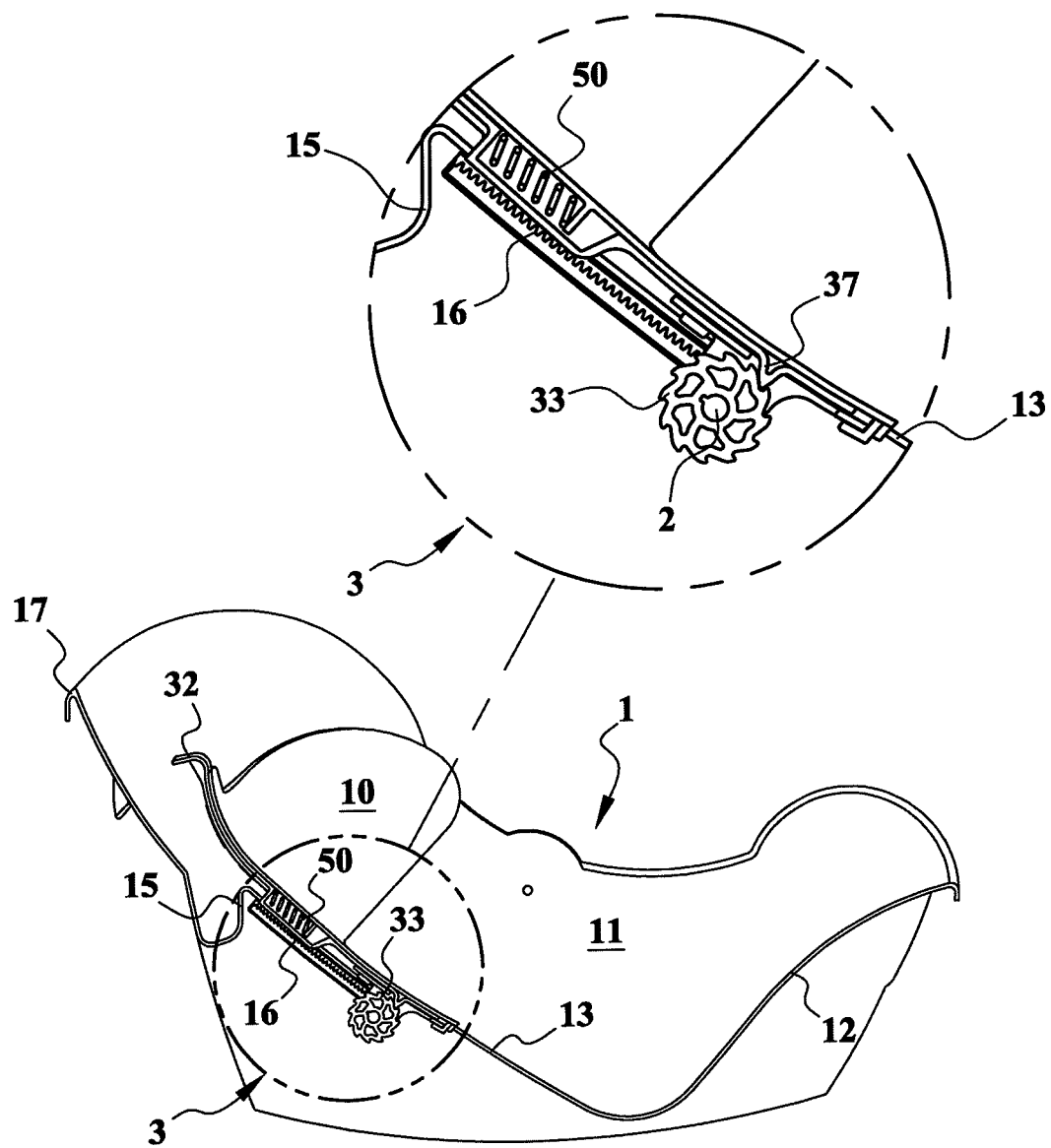
FIG. 4 is a schematic cross-sectional view showing the connecting relation between the adjustment mechanism and the headrest inside the infant car seat.
Figure 5:
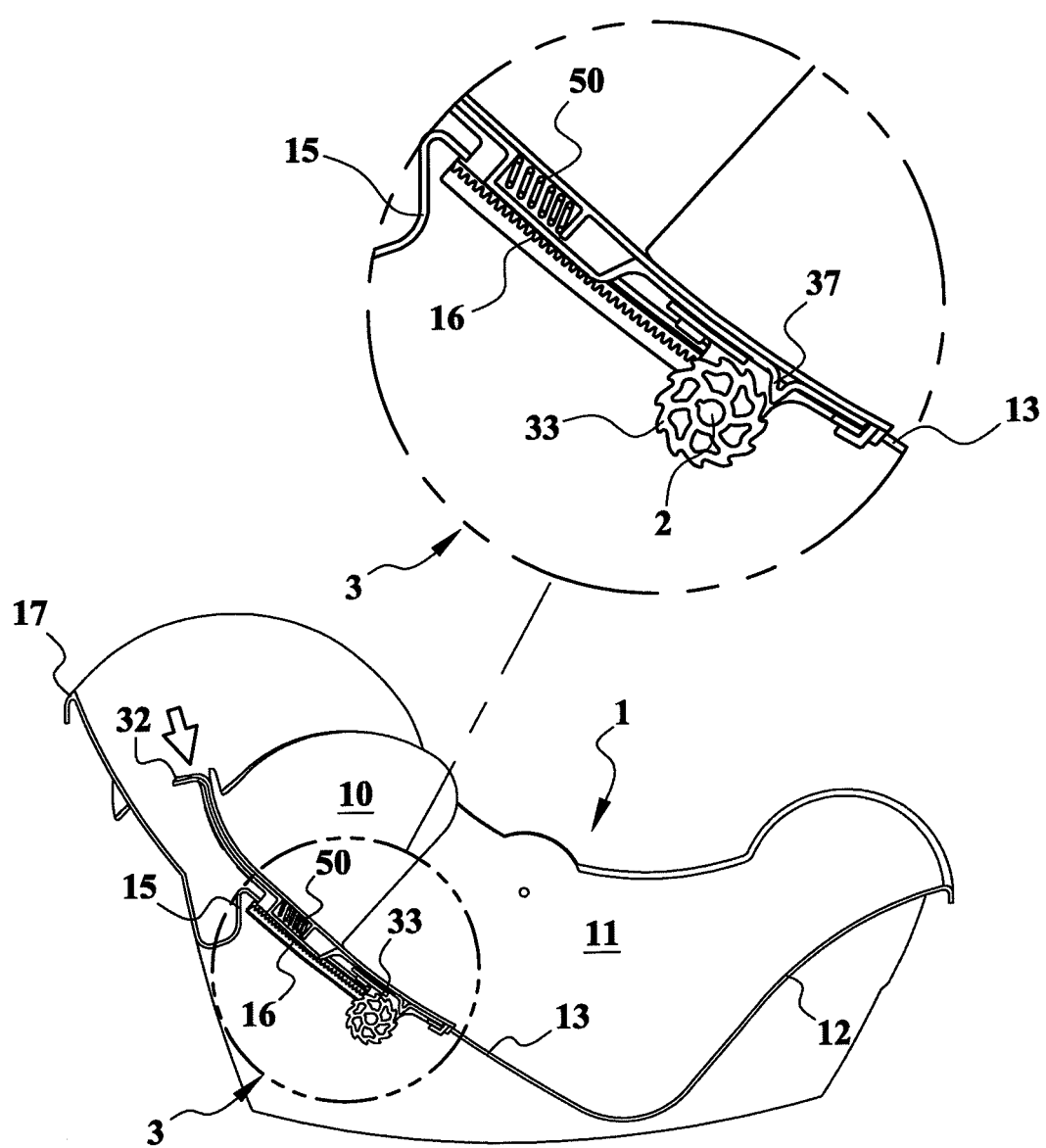
FIG. 5 is a schematic cross-sectional view showing the release operation of the adjustment mechanism by pushing a brake release handle for repositioning the headrest inside the infant car seat.
Figure 6:
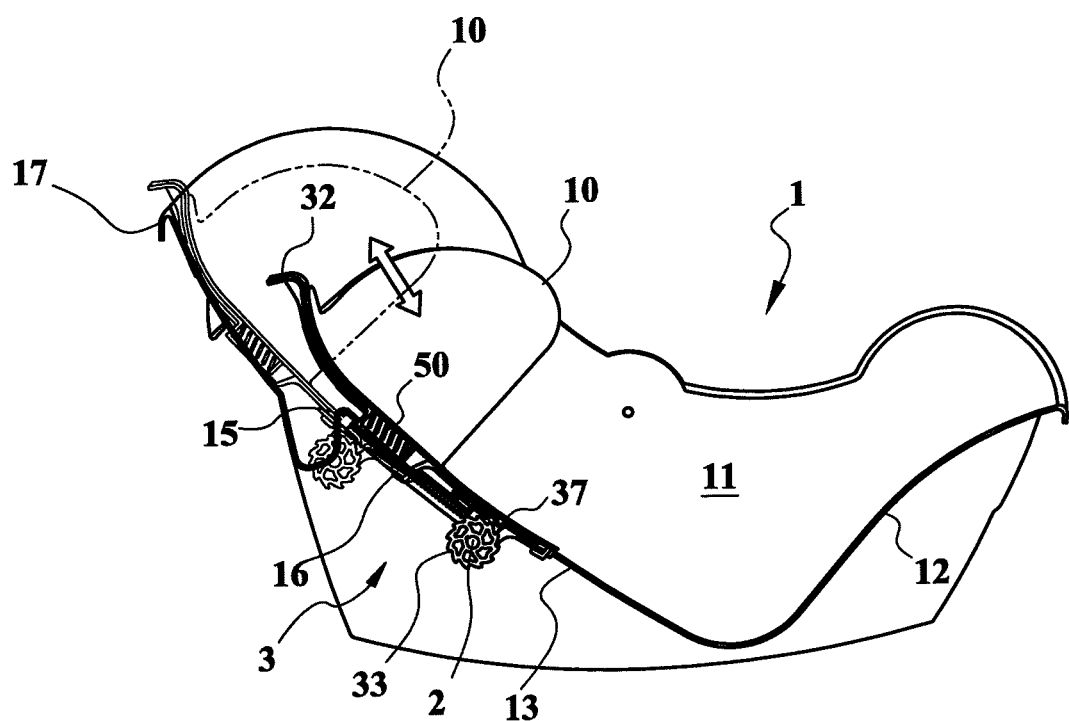
FIG. 6 is a schematic cross-sectional view showing the headrest is capable of moving inside the infant car seat when being unlocked by pushing the brake release handle.
Figure 7:
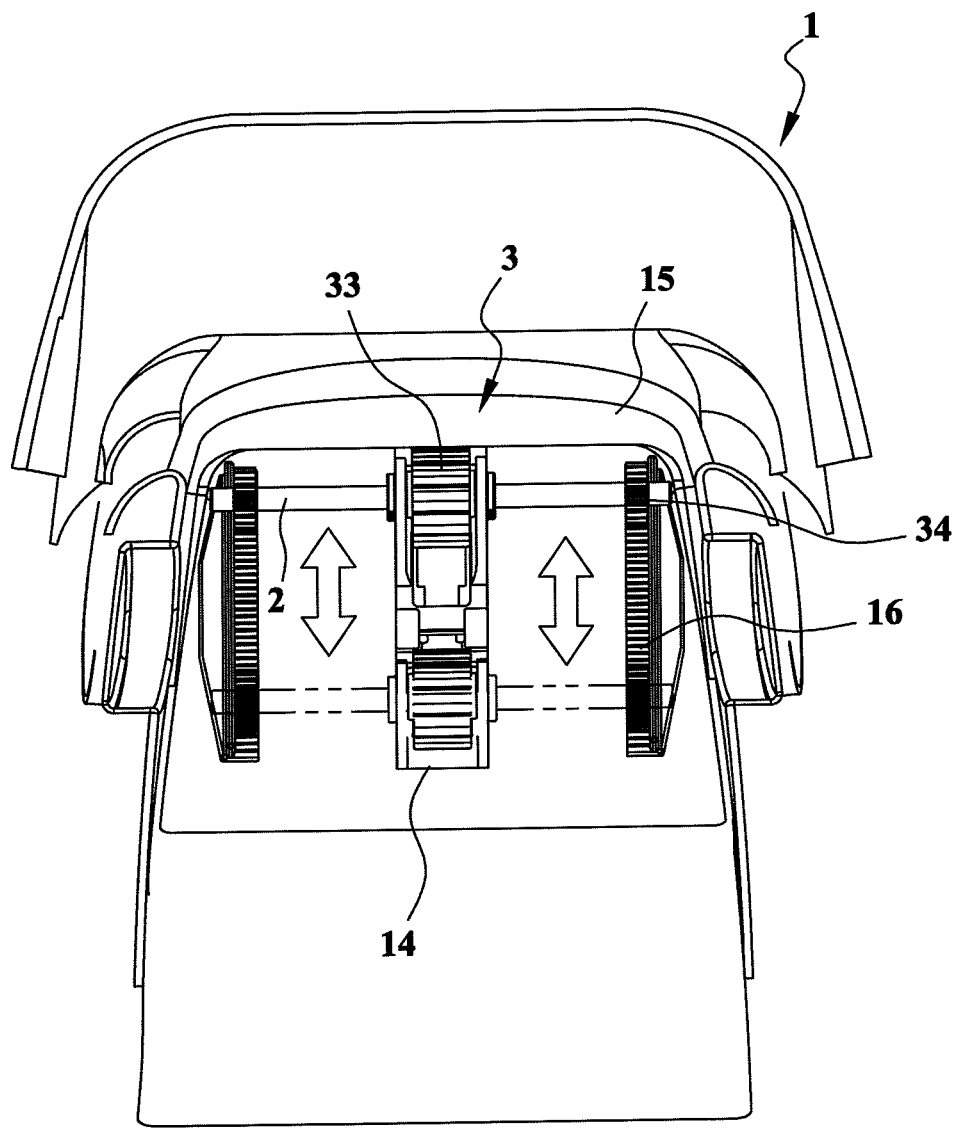
FIG. 7 is a schematic bottom planar view showing an operation of the adjustment mechanism.

Reference will now be made in detail to the preferred embodiments of the present invention; examples of which are illustrated in the accompanying drawings.

Referring to FIGS. 1 to 7, a preferred embodiment of the adjustment mechanism 3 for positioning a headrest 10 in an infant car seat according to the present invention, which may include a connector 31, a pair of gear wheels 34, a ratchet wheel 33 and a brake release handle 32.

The infant car seat comprises at least a main body 12 made of plastic by molding method, covered with fabric and formed with a butt support portion 12 and a back support portion 13 that provides a sitting space 11 for an infant occupant.

Lower than the height of the top flange 17, the back support portion 13 is formed with a longitudinal slot 14 for guiding the headrest 10 to moving along the back support portion 13, and a pair of toothed guiding rails 16 formed on the underside 15 of the back support portion 13 in parallel on either side of the longitudinal slot 14.

The headrest 10 is movably connected to the back support portion 13 by the connector 31 to move along the longitudinal slot 14.

The pair of gear wheels 34 and a ratchet wheel 33 are pivoted on the connector 31, the pair of gear wheels 34 being engaged with the pair of toothed guiding rails 16 and kept synchronized rotation with the ratchet wheel 33. Preferably, the pair of gear wheels 34 and the ratchet wheel 33 are pivoted to the connector 31 by same one synchro shaft 2 thereby keeping in a synchronized rotation and brake.

The brake release handle 32 has one end exposed near the headrest 10 and being easy accessible to user, and another end formed with a protruded portion 37 for releasably locking the ratchet wheel 33 thereby preventing the pair of gear wheels 34 from moving along the pair of toothed guiding rails 16, so as to lock and keep the headrest 10 at a selected height or position.

The brake release handle 32 may be biased to releasably lock the ratchet wheel 33 and used to unlock the ratchet wheel 33 so as to reposition the headrest 10. Preferably, the brake release handle 32 may be biased by a resilient element 50 to brake the ratchet wheel 33. Further, the brake release handle 32 may have one end exposed from the top end of the headrest 10 and accessible by user's hand. In the present embodiment, the brake release handle 32 is slidably connected between the headrest 10 and the back support portion 13.

Figure 8:
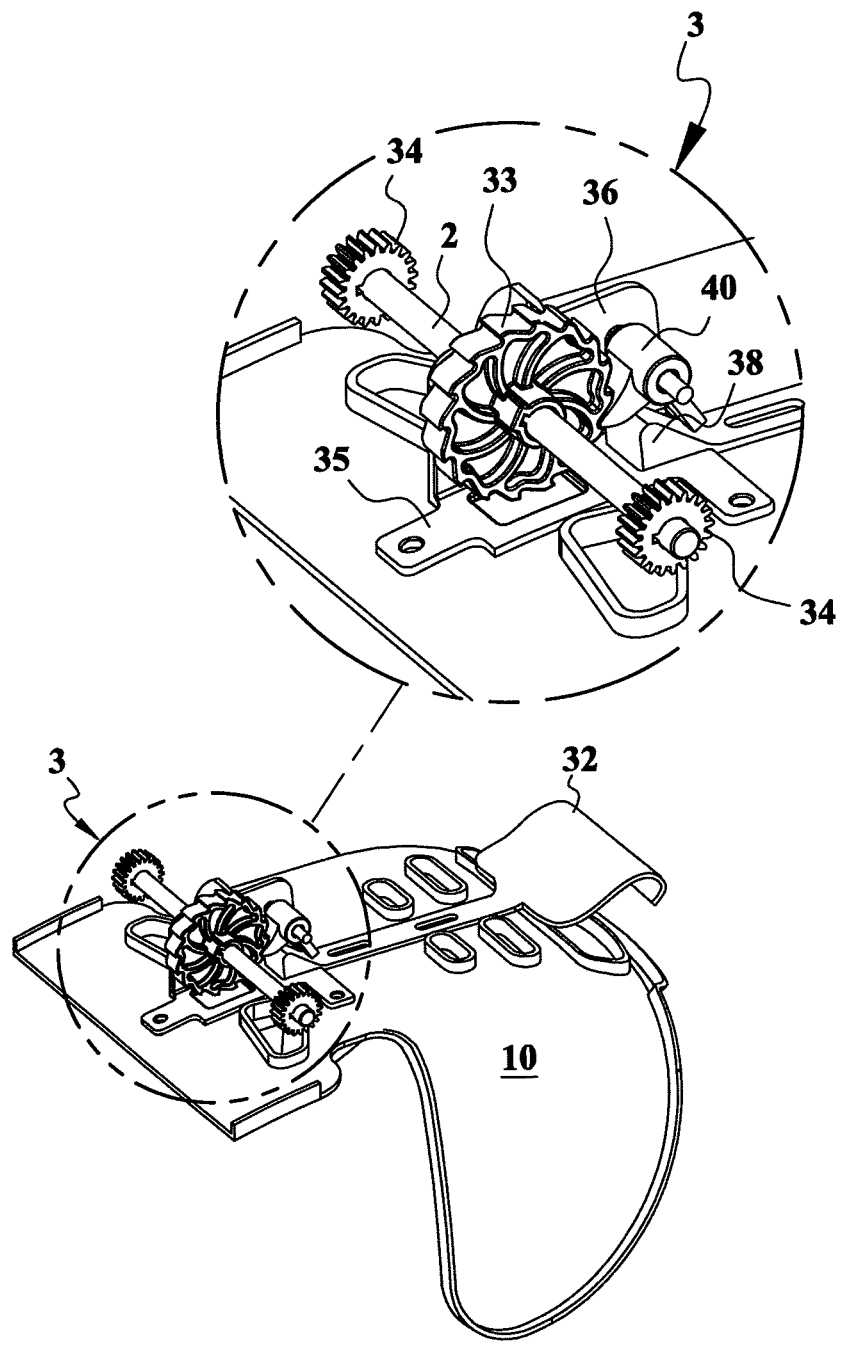
FIG. 8 is a schematic perspective view showing an alternative embodiment of the adjustment mechanism.

Referring to FIG. 8, an alternative embodiment of the adjustment mechanism 3 may further include a spring-biased seesaw element 40 which has one end biased to be engaged with the ratchet wheel 33, and another end driven by the brake release handle 32 for rotating the spring-biased seesaw element 40 to release the ratchet wheel 33.

Preferably, the brake release handle 32 may be formed with a protruded end 38 for driving and rotating the spring-biased seesaw element 40 so as to release the ratchet wheel 33 and adjust the headrest 10 to a new position.

In this embodiment, the spring-biased seesaw element 40 may be pivoted to a mount 35 and associated between the ratchet wheel 33 and the brake release handle 32.

Figure 9:
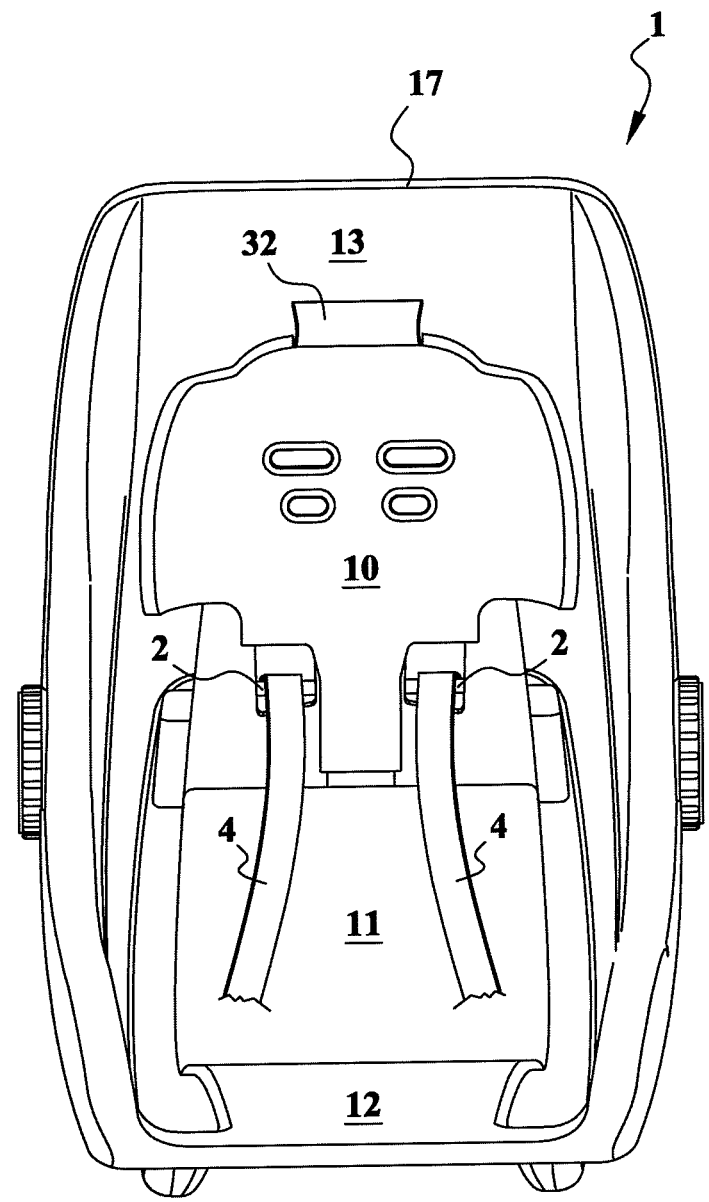
FIG. 9 is a schematic top planar view showing a pair of shoulder belts each has an upper end connected to the adjustment mechanism and adjustable with the headrest.

Preferably the upper end of a shoulder belt 4 may be connected to the headrest 10. Referring to FIG. 9, in an embodiment, the upper end of a shoulder belt 4 is connected to the synchro shaft 2 so as to be carried by the adjustment mechanism 3. When the headrest 10 is adjusted according to the infant's head, the upper end of the shoulder belt 4 shall be moved to near the shoulder of the infant occupant.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. An adjustment mechanism for positioning a headrest in an infant car seat, the infant car seat comprises at least a main body 12, having a butt support portion 12 and a back support portion 13; the back support portion 13 being formed with a longitudinal slot 14 for guiding the headrest 10 to moving along the back support portion 13 and a pair of toothed guiding rails 16 in parallel on either side of the longitudinal slot 14; and the adjustment mechanism 3, including:
   a connector 31, connected the headrest 10 to the back support portion 13 for carrying the headrest 10 to move along the longitudinal slot 14;
   a pair of gear wheels 34 and a ratchet wheel 33 mounted on a synchro shaft 2 for concurrent rotation and pivoted on the connector 31, the pair of gear wheels 34 being engaged with the pair of toothed guiding rails 16; and
   a brake release handle 32, for releasably locking the ratchet wheel 33 thereby stopping the rotation of the pair of gear wheels 34 so as to lock the headrest 10 at a selected position.

2. The adjustment mechanism for positioning a headrest in an infant car seat of claim 1, wherein the brake release handle 32 has one end exposed and accessible to user, and another end formed with a protruded portion 37 for releasably locking the ratchet wheel 33 thereby preventing the pair of gear wheels 34 from moving along the pair of toothed guiding rails 16, so as to lock the headrest 10 at a selected position.

3. The adjustment mechanism for positioning a headrest in an infant car seat of claim 1, wherein the pair of gear wheels 34 and the ratchet wheel 33 are pivoted to the connector 31 by the synchro shaft 2 for concurrent rotation and braking with each other.

4. The adjustment mechanism for positioning a headrest in an infant car seat of claim 3, wherein a pair of shoulder belts 4 each has an upper end connected to the synchro shaft 2.

5. The adjustment mechanism for positioning a headrest in an infant car seat of claim 1, wherein the brake release handle 32 is biased by a resilient element 50 to brake the ratchet wheel 33.

6. The adjustment mechanism for positioning a headrest in an infant car seat of claim 1, wherein the brake release handle 32 has one end exposed from the top end of the headrest 10 and accessible by user.

7. The adjustment mechanism for positioning a headrest in an infant car seat of claim 1, wherein the brake release handle 32 is slidably connected between the headrest 10 and the back support portion 13.

8. The adjustment mechanism for positioning a headrest in an infant car seat of claim 1, further include a spring-biased pivotal latch 40 having one end biased to be engaged with the ratchet wheel 33, and another end driven by the brake release handle 32 for rotating the spring-biased seesaw element 40 to release the ratchet wheel 33.

9. The adjustment mechanism for positioning a headrest in an infant car seat of claim 8, wherein the spring-biased pivotal latch 40 pivotally connects the ratchet wheel 33 and the brake release handle 32.

10. The adjustment mechanism for positioning a headrest in an infant car seat of claim 8, wherein the brake release handle 32 is formed with a protruded end 38 for rotating the spring-biased pivotal latch 40 so as to release the ratchet wheel 33.

11. The adjustment mechanism for positioning a headrest in an infant car seat of claim 1, further includes a pair of shoulder belts 4 each has an upper end connected to the headrest 10.

* * * * *